United States Patent
Restivo, Sr. et al.

(10) Patent No.: US 7,104,461 B2
(45) Date of Patent: Sep. 12, 2006

(54) PIPE TEMPERATURE CONTROL VALVE

(75) Inventors: Angelo S. Restivo, Sr., Denham Springs, LA (US); Clifford D. Holland, Denham Springs, LA (US)

(73) Assignee: Restivo & Holland, LLC, Walker, LA (US)

( * ) Notice: Subject to any disclaimer, the term of this patent is extended or adjusted under 35 U.S.C. 154(b) by 139 days.

(21) Appl. No.: 10/785,023

(22) Filed: Feb. 25, 2004

(65) Prior Publication Data
US 2006/0016902 A1  Jan. 26, 2006

Related U.S. Application Data

(60) Provisional application No. 60/450,249, filed on Feb. 27, 2003.

(51) Int. Cl.
G05D 23/02 (2006.01)
G05D 23/08 (2006.01)
G05D 23/12 (2006.01)

(52) U.S. Cl. .................... 236/93 R; 236/12.1
(58) Field of Classification Search ............ 236/93 R, 236/12.1, 12 H
See application file for complete search history.

(56) References Cited

U.S. PATENT DOCUMENTS

| | | |
|---|---|---|
| 503,932 A | 8/1893 | Keeney |
| 3,446,226 A | 5/1969 | Canterbury |
| RE29,155 E | 3/1977 | Mears |
| 4,044,754 A | 8/1977 | Cronin |
| 4,311,272 A * | 1/1982 | Foller ............... 236/59 |
| 4,460,006 A * | 7/1984 | Kolze ............... 137/62 |
| 4,471,906 A * | 9/1984 | Noguchi et al. ....... 236/59 |
| 4,638,828 A | 1/1987 | Barrineau |
| 4,667,694 A | 5/1987 | Dalton |
| 4,809,727 A | 3/1989 | Chamberlin |
| 4,821,954 A * | 4/1989 | Bowder ............. 236/48 R |
| 4,848,389 A | 7/1989 | Pirkle |
| 5,421,362 A * | 6/1995 | Sordello ............ 137/351 |
| 6,021,798 A | 2/2000 | Martin |
| 6,102,127 A | 8/2000 | Pierce |
| 6,860,432 B1 * | 3/2005 | Conover et al. ........ 236/93 R |

OTHER PUBLICATIONS

Therm-Omega-Tech Freeze Protection Valve and Heat Protection valve printed from http://thermomegatech.com on Jan. 5, 2005 (6 pages).

Installation and Maintenance Instructions allegedly printed Jul. 1995. (2 pages).

* cited by examiner

*Primary Examiner*—Marc Norman
(74) *Attorney, Agent, or Firm*—Merek, Blackmon & Voorhees, LLC

(57) ABSTRACT

A control valve for preventing freezing in a pipe. A ball valve selectively biased against a valve seat is controlled by a bimetallic snap disk. The control valve is connected to one or more water pipes. When the temperature in the pipe or in the control valve is below a certain temperature, the valve opens to allow a small quantity of water to flow through the valve to allow warmer ground water to warm liquid in the pipes. When the water is warmed to a set temperature the valve closes again allowing normal operation of the supply pipes.

18 Claims, 1 Drawing Sheet

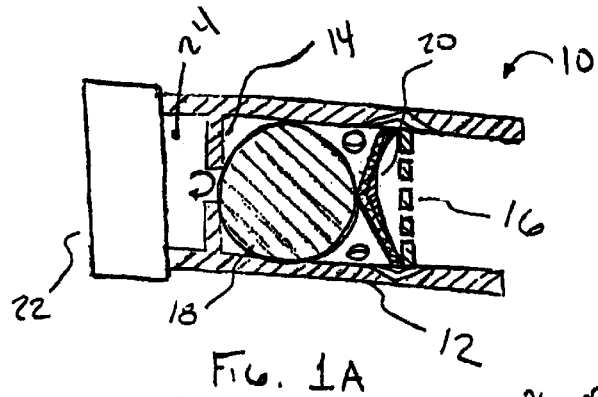
FIG. 1A
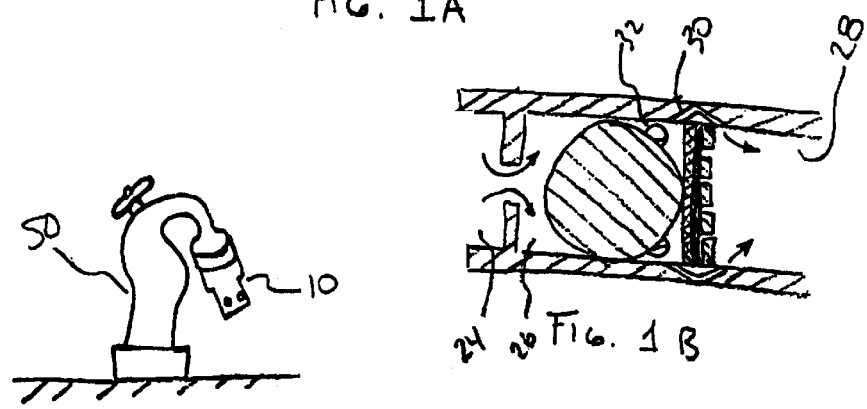
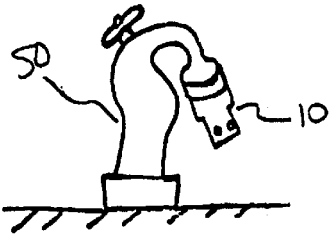
FIG. 1B
FIG. 2.
FIG. 3
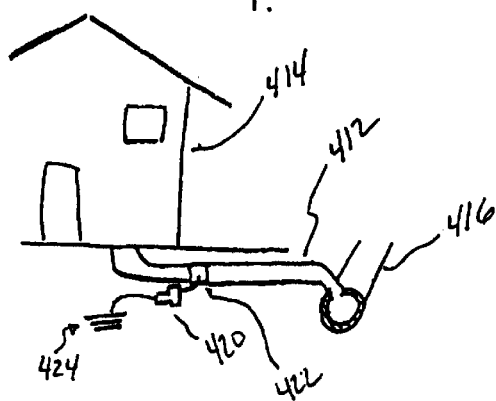
FIG. 4.
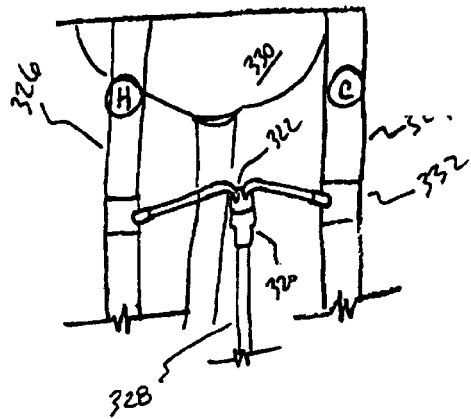

PIPE TEMPERATURE CONTROL VALVE

CROSS REFERENCE TO RELATED APPLICATIONS

This application claims the benefit of U.S. Provisional Application, 60/450,249, filed Feb. 27, 2003, which is herein incorporated by reference.

BACKGROUND OF THE INVENTION

A. Field of the Invention

The present invention relates to device for preventing pipes and other liquid carriers from freezing.

B. Description of the Prior Art

The number two cause of property damage is water damage. Freezing pipes cause a disproportionate amount of preventable water damage, when simple circulation of the water could elevate the temperature in the pipe sufficient to prevent freezing of the pipes.

Regulations require that water mains and other underground runs of water pipes be maintained a certain distance below the surface. In addition to the obvious protection provided to the pipes from digging, roots and other potential physical damage, the natural insulation and heating of the ground below the surface can ensure that the water in the pipes can not freeze. Simple calculations provide that running the pipes 24–36 inches below the surface, depending on how far or north the locale is, will maintain the water lines at or above approximately 50 degrees.

However, once the pipe is brought to the surface to connect to a house or piping within a house or other structure, the pipe is not longer insulated by the ground. In inclement weather, this piping can freeze. The expansion of the ice within the pipes can cause the pipes to burst resulting in immediate water damage or damage after the water thaws. Typically this temperature drop can be avoided by either adequate interior heating keeping the pipes and the liquid therein warm. The temperature drop can also be avoided by using the water lines, which causes a constant introduction of city water at 50 degrees from the water main, or hot water from the hot water heater, in the cold water and hot water supplies, respectively.

This damage can be severe, especially considering that one of the hardest hit properties by water damage is vacation houses or other sparingly used structures. Owners often turn off the interior heating and shut off the hot water heater, subjecting the interior hot water and cold water supply pipes to potentially sub-freezing temperatures. Since the house sits in disuse, the water is not circulated. If freezing temperatures exist outside the pipes, the liquid inside the pipe will soon freeze. And once the pipes burst under the force of the ice inside the pipes, large quantities of water may leak before the owner returns to discover the leak.

One prior art device that has been used in the past on exterior faucets is a drip sleeve. A sleeve having a threaded receiver is installed on a faucet. An internal throat allows water to pass unrestricted therethrough when the faucet is turned on. The sleeve has threads at a second end so that a garden hose or such can be threaded thereto such that the faucet can operate normally as if the sleeve were not in installed. During cold weather, the sleeve can be rotated to allow a limited amount of constant flow ("drip") to provide water constantly flowing through the pipe to constantly introduce 50 degree city water through the pipe to maintain above freezing water temperatures in the pipes. Additionally, the effect of constantly flowing water is also known to inhibit the production of ice. However, this device has the drawback that a large quantity of water will flow through the sleeve while in operation, and the flow is not a function of the water temperature so may flow be completely unnecessary for the protection of the pipes.

The current invention provides a simple temperature release valve that allows only a discrete amount of water to flow to drain (or to waste) sufficient to raise the temperature of the water in the pipes to prevent freezing. None of the above inventions and patents, taken either singly or in combination, is seen to describe the instant invention as claimed.

SUMMARY OF THE INVENTION

The present invention is accomplished by providing a temperature operated valve connected in line with or in parallel with a water conduit. The valve is preferably a ball valve having a temperature-operated spring in the form of a snap disk. The snap disk is controllable to a high degree to both the actuation temperature and the deactivation temperature. The snap disk is preferred because of the high spring force differential between the activation pressure and the deactivation force.

Accordingly, it is a principal object of the invention to provide a temperature controlled valve that initiates flow in a water conduit when temperature falls to a first temperature and shuts off flow when the temperature rises to a second temperature.

It is another object of the invention to provide a temperature controlled valve that uses a ball valve to seal and unseal a valve seat.

It is a further object of the invention to provide a snap disk spring to extend and with draw a valve from a valve seat.

Still another object of the invention is to provide a temperature control valve that can be installed intermediate two diverse flow conduits to control the temperature simultaneously in both flow conduits.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1A is a partial cross-sectional view of a temperature control valve according to a first embodiment of the invention in a sealed condition.

FIG. 1B is a partial cross-sectional view of the temperature control valve according to a first embodiment of the invention in an unsealed condition.

FIG. 2 is an environmental view of the temperature control valve installed on an outdoor faucet.

FIG. 3 is a partial environmental view of temperature control valve according to a second embodiment of the invention installed on an indoor faucet.

FIG. 4 is a diagrammatic view of a temperature control valve according to a third embodiment installed on a water main.

Similar reference characters denote corresponding features consistently throughout the attached drawings.

DETAILED DESCRIPTION OF THE PREFERRED EMBODIMENT(S)

The present invention is to a pipe temperature control valve 10 to prevent pipes from freezing. As shown in FIGS. 1A, 1B and 2, the control valve includes a cylindrical body 12, a valve seat 14 and spring rest plate 16. While a cylindrical body is shown, one skilled in the art would appreciate that a myriad of shapes is possible, but a cylindrical shape matches closely with the shape of the pipes and controls the movement of the ball valve 18 and snap disk 20 contained therein. Preferably, a coupling device 22 such as a threaded collar 22 is provided at a first end to couple the control valve 10 to the exit of a faucet 50 (FIG. 2). However, other coupling devices would be apparent to one skilled in the art to connect the device to various liquid conduits.

The snap disk ("bimetallic spring") is a prior art device preferably made of bimetal, that is two disparate metals. The shape can be semi-spherical or slightly conical. Below a certain operating temperature, the disk maintains a substantially or relative flat profile ("distended position") as seen in profile. When the temperature reaches a second operating temperature, the device snaps outwardly ("bows outward") with substantial force to assume an extended position. Because of the profile and the use of disparate metals, the device tends to only assume the extended and distended positions by snapping like a child's jumping toy rather than gradually advancing from one position to another. This snap disk finds a unique application in the present device by a) providing sufficient force to overcome any resistance of the liquid and to seal the ball valve 18 against the valve seat 14 independent of the amount of water pressure from water in open faucet 50 to prevent leakage, b) to provide discrete activated and deactivated states for the valve, and c) to provide highly regulated and repeatable operating temperature ranges ("transition temperatures") and both the high and low temperature. It is believed that the snap disk is currently marketed by THERMO DISK (TM) for other applications.

In operation, the devices is threaded attached by coupling device 22 to the outlet of a faucet 50. The faucet is opened slightly to allow liquid to flow through the faucet to the valve entrance. The flow should not be great enough that the liquid pressure will prematurely force the ball valve 18 away from the valve seat 14. As shown in FIG. 1A, when the temperature of the water is above a certain temperature, preferably 44 degrees, the snap disk will be in its extended ("deactivation") position. In this position, the snap disk is extended sufficient to force the ball valve 18 upwardly against valve seat 14 to close off any flow between the chambers above and below the valve seat.

As shown in FIG. 1B, when the temperature drops below the lower safety temperature, preferably 33 degrees, the snap disk 20 snaps to it's distended ("activation") position. With the force removed from the bottom of ball valve 18, the ball is free to move away from the seat 14 allowing flow between the chamber 24 above the valve seat and the chamber 26 below the valve seat. Water in the chamber 26 can flow around and past the ball valve 26. The chamber 26 may be tapered outwardly from top to bottom, if necessary, to allow flow past the ball valve in the activation position shown in FIG. 1B, while ensuring proper positioning of the ball valve against the seat. However, by properly selecting the clearance above the ball and the amount of rise in the snap disk 20, the ball should seat properly in the valve seat while allowing clearance between the ball and the housing walls.

As water flows around the ball valve, the liquid preferably flows past the flap disk through a perforated spring seat 16 to the outlet 28 and to the ground near the faucet. If necessary, through passages 30 can be provided in the wall 12 to flow around the snap disk 20 to the exit 28. An outlet pipe (not shown) can be attached or threaded to the outlet chamber to transport the exiting liquid to a drain or other collection area, if desired. For the outdoor faucet, openings 32 extending through the outer housing wall 12 to reduce the cost of the unit and reduce the need for cast or otherwise expensively formed passages in the wall 12. Since the liquid does not need to be directed to a collection area for disposal, the outside faucet can be drained directly to the environment surrounding the control valve.

Once a sufficient amount of 50 degree water from the city water main has elevated the temperature to the shut off temperature sufficient to snap the snap disk to its extended position, the valve will seal again as discussed above. Since the snap disk has discrete on and off positions, the valve will close at the same temperature regardless of the amount of pressure provided by the amount of opening in the faucet. A normal spring or temperature expanding metal spring would be biased downwardly by the force of the water from the faucet potentially resulting in a different shut off point depending on the degree that the faucet is opened and the temperature of the water in the pipe, potentially wasting more water than is necessary to prevent the pipe form freezing.

Preferably, the control valve allows only a small flow rate to pass through, preferably in the range of 0.25 to 0.5 gpm. In this way, only a small quantity of water such as 2–5 gallons of water is required to maintain the water above freezing, a small premium compared to the potential damage of a burst pipe.

FIG. 4 shows a third embodiment of the invention. Water mains that are planted 24–36 inches minimum below the surface, depending on the climate, will maintain water temperatures inside the pipe at above 50 degrees. However, once the pipe is exposed to connect to a house or especially a mobile home, the temperature of water in a long run from the water main may be susceptible to freezing.

FIG. 4 shows a run 412 of pipe between a house 414 and a city water main 416. To protect this run, a pipe temperature control valve 420 is installed as close to the inlet to the house as is practical, though for clarity is shown a distance from the house 414 in the drawing. An adapter sleeve 422 is provided along the run 412 and is coupled with the run such that the main volume of flow flows unobstructed through the run. Along one side of the adapter sleeve is connected a control valve 420 in parallel flow with the run 412. The control valve can be attached to the sleeve 422, integral with the sleeve, or connected to the sleeve by a short pipe. Preferably the control valve is close enough to the sleeve 422 to sense a temperature similar to that in the pipe. Preferably the exit of the control valve is connected to a drain pipe that leads to a collection area 424 such as a drain.

The control valve is configured and operates the same as that shown in FIGS. 1A & 1B with the exception that no outlet holes 32 are provided to force all flow through the valve exit 28 into the drain pipe and drain 424. In operation, when the flow in the run 412 is stagnant, such as when there is no demand for water from the house 414, the water temperature will fall with the surrounding environment. This is especially true if the run 412 is near or above ground. When the temperature at the sleeve and thus at the control valve reaches 33 degrees or the low safety temperature, the snap disk 20 will withdraw as shown in FIG. 1B allowing a small quantity of water to trickle through the control valve drawing city main water ("ground water") to enter the run 412 elevating the temperature of the water in the pipe 412. As the temperature is elevated to 42 degrees, the snap disk spring 20 will extend shutting off the flow through the valve as described above. In this way, a small amount of flow relative to the capacity of the water supply pipe 412 can be conducted through the control valve 420 sufficient to prevent freezing in the pipe, while having little to no impact of the normal operation of the water supply pipe when freezing is not imminent.

While shown in an exterior position, one skilled in the art would appreciate that this third embodiment could be installed on any single liquid conduit where a suitable collection for the water conducted through the valve can be spent.

FIG. 3 shows an alternate second embodiment of the device. In this embodiment, the device is installed in an interior setting such as a kitchen or bathroom faucet. The device operates between two separate pipes to simultaneously provide temperature protection for both pipes.

As shown in FIG. 3, the control valve 320 is connected at its intake to a manifold 322 which receives flow from both the cold water supply 324 and the hot water supply 326 on a faucet. In practice, the cold supply and hot supply may be connected such that the cold flow is higher (or lower) than the hot flow into the manifold by throttling or supply line size or other appropriate flow restrictors as necessary to adjust for capacity in the supply pipes (324, 326) or various other considerations. The outlet of the control valve is connected to an outlet pipe which preferably feeds back into the drain from the sink 330.

In a preferred embodiment, a sleeve 332 is attached intermediate the cold supply line analogous to the sleeve 422 of the third embodiment to simplify installation of the control valve and to reduce interference with the normal operation of the supply line. Similarly, a like sleeve is attached on the hot supply line to connect the control valve to the hot supply line.

Since the hot water heater may be shut off as well or disused, it is important to connect the device to the hot water supply line as well to protect against the hot water supply line breaking. It is important to note that if the hot water heater is off, the city water ("ground water") is the eventual source of water to the hot water supply line, so a trickle of the hot water supply line will still introduce 50 degree water to the hot water supply line, even if the water heater is off.

When the temperature inside the combined flow of the hot water supply and cold water supply reach a low safety temperature such as 42 degrees, the snap disk 20 collapses to unseat ball valve 18 to allow flow through the control valve. The optional outlet holes 32 are not provided, to ensure that the flow through the valve is conducted to the exit 28 and on to the drain pipe 328 and to drain. The temperature selected for activating the control valve is higher than in the outdoor embodiments because it is expected that if the water reaching the indoor faucet is 42 degrees, then the temperature of water entering the house and other areas up stream of the faucet may be close to freezing. For this reason, the device is most effective when placed on a faucet furthest from the water inlet into the house or mobile home. Additionally this will serve to bring fresh warmer water to the greatest amount of pipes in the house.

When the temperature of the water is elevated to a safe temperature, preferably 48 degrees, the bimetal disk ("snap disk") will re-expand causing the ball valve to seat sealing off flow through the control valve as discussed previously. In this way, both lines inside the house can be protected. If necessary or installed in very inclement weather zones, more than one control valve or more than one type of control valve can be used together to provide protection to a house or other structure.

It is to be understood that the present invention is not limited to the sole embodiment described above, but encompasses any and all embodiments within the scope of the following claims. One skilled in the art would recognize that the control valve could be used as well to limit high temperature in a pipe by reversing the operation of the valve seating (i.e., by pushing a ball away from a seat) or by analogous means or by selecting a bimetallic snap disk that operates in reverse. Additionally, the manifold 322 could accept one, two, three or more input lines to apply a control valve to multiple lines.

The invention claimed is:

1. A temperature control device for preventing liquid in a pipe from freezing comprising:
   a control valve having a housing in fluid communication with the liquid in the pipe, a valve seat, a ball valve and a bimetallic disk, an inlet and an outlet;
   wherein said bimetallic disk has a first deactivated position wherein said bimetallic valve presses said ball valve against said valve seat to prevent flow through said control valve body, and a second activated position wherein said bimetallic releases said ball valve from said valve seat to allow flow through said control valve body;
   wherein when the temperature of liquid in said housing is above a first predetermined temperature the bimetallic disk moves to said first position and when the temperature is below a second predetermined temperature the bimetallic disk moves to said second position to allow liquid in said pipe to flow through said control valve, and
   a perforated spring seat is positioned within said control valve to permit the flow of liquid through said control valve.

2. The temperature control device as set forth in claim 1 wherein:
   a. a passage is located in said control valve to permit the flow of liquid around said bimetallic disk.

3. The temperature control device as set forth in claim 1 wherein:
   a. said control valve is connected to a drain pipe for facilitating the flow of liquid to a drain.

4. The temperature control device as set forth in claim 1 wherein:
   a. said control valve is connected to a manifold; and,
   b. said manifold receives flow of liquid from a plurality of sources.

5. The temperature control device as set forth in claim 4 wherein:
   a. said plurality of sources includes a cold water supply and a hot water supply.

6. The temperature control device as set forth in claim 1 wherein:
   a. said bimetallic disk operates to form a first activated position at a temperature of about 42 degrees Fahrenheit.

7. The temperature control device as set forth in claim 6, further comprising:
   a. a sleeve for connecting said manifold to a cold water supply and said hot water supply.

8. The temperature control device as set forth in claim 1 wherein:

a. said bimetallic disk operates to return to a deactivated position at about 48 degrees Fahrenheit.

9. A temperature control device for preventing fluid in a pipe from freezing comprising:
  a) a control valve having a housing;
  b) said housing having a coupler for attaching said housing to a fluid supply pipe;
  c) said housing further including a chamber having a fluid inlet opening and a fluid outlet opening;
  d) a valve mechanism located within said chamber for controlling the flow of fluid from said fluid inlet opening through said chamber to exit through said fluid outlet opening;
  e) said valve mechanism having a temperature sensitive bimetallic disk having an outer edge and a central portion;
  f) said bimetallic disk having a first configuration in which said central portion of said disk and said edge form a flat surface and upon a change in temperature said bimetallic disk has a second configuration in which said central portion is displaced from said edge to form a curved surface;
  g) an inlet closure device located in said chamber adjacent said bimetallic disk and being operable in conjunction with said bimetallic disk to open and close said inlet in response to a change in temperature of fluid in said fluid supply pipe, and
  a perforated spring seat is positioned within said chamber to permit the flow of fluid from said chamber to said fluid outlet.

10. The temperature control device as set forth in claim 9 wherein;
  a. said inlet closure device is a ball valve which moves in response to changes in configuration of said bimetallic disk.

11. The temperature control device as set forth in claim 9 wherein:
  a. a passage is located in said chamber adjacent said fluid outlet to permit the flow of fluid around said bimetallic disk.

12. The temperature control device as set forth in claim 9 wherein:
  a. said coupler is a threaded collar.

13. The temperature control device as set forth in claim 9 wherein:
  a. said fluid outlet is connected to a drain pipe for facilitating the flow of fluid to a drain.

14. The temperature control device as set forth in claim 9 wherein:
  a. said fluid inlet is connected to a manifold; and,
  b. said manifold receives flow of fluid from a plurality of sources.

15. The temperature control device as set forth in claim 14 wherein:
  a. said plurality of sources includes a cold water supply and a hot water supply.

16. The temperature control device as set forth in claim 15, further comprising:
  a. a sleeve for connecting said manifold to a cold water supply and said hot water supply.

17. The temperature control device as set forth in claim 9 wherein:
  a. said bimetallic disk operates to form a curved surface at a temperature of about 42 degrees Fahrenheit.

18. The temperature control device as set forth in claim 9 wherein:
  a. said bimetallic disk operates to return to a flat surface at about 48 degrees Fahrenheit.

* * * * *